United States Patent [19]

Krude

[11] 4,012,925
[45] Mar. 22, 1977

[54] CONSTANT VELOCITY TORQUE TRANSMITTING JOINT

[75] Inventor: Werner Krude, Neunkirchen, Germany

[73] Assignee: Löhr & Bromkamp GmbH, Offenbach, Main, Germany

[22] Filed: Dec. 11, 1975

[21] Appl. No.: 639,752

[30] Foreign Application Priority Data

Dec. 23, 1974 Germany .......................... 2461289

[52] U.S. Cl. ......................................... 64/21; 64/8
[51] Int. Cl.² ......................................... F16D 3/30
[58] Field of Search ............................. 64/21, 8, 7

[56] References Cited
UNITED STATES PATENTS 3,553,979  1/1971  Noguchi et al. ...................... 64/21
3,789,626  2/1974  Girguis ................................. 64/21

Primary Examiner—Samuel Scott
Assistant Examiner—Randall Heald
Attorney, Agent, or Firm—Edmund M. Jaskiewicz

[57] ABSTRACT

A constant velocity torque transmitting joint comprises an outer joint member having a bore therethrough and an inner joint member positioned within the bore. A plurality of torque transmitting elements, such as balls, are positioned within pairs of opposed grooves formed in the opposing surfaces of the inner and outer joint members. A cage is disposed between the joint members and has a plurality of openings in which the balls are retained. The cage has an inner concave surface guided upon a separate alignment control device supported upon the inner joint member. The cage also has an outer spherical surface which is guided within the bore. The alignment control device comprises at least three control elements in the shape of balls, cylindrical rollers or barrel-shaped rollers supported in recesses provided between pairs of adjacent track grooves in the inner joint member. The centers of the control elements and of the cage inner concave surface are positioned in a common plane.

5 Claims, 7 Drawing Figures

CONSTANT VELOCITY TORQUE TRANSMITTING JOINT

The present invention relates to constant velocity torque transmitting joints, more particularly, to the alignment control device utilized in such a joint.

One form of a constant velocity torque transmitting joint, or universal joint, which has been known comprises an outer joint member having a bore therethrough with an inner joint member positioned within the bore. The bore and the outer surface of the inner joint member are each provided with a corresponding number of grooves and a torque transmitting element which may be a ball is positioned in each pair of opposed grooves. A cage is disposed between the joint members and comprises a plurality of openings which retain the balls therein such that the balls are positioned in a plane perpendicular to the longitudinal axis of the cage and which bisects the bending angle between the inner and outer joint members. The cage has an inner concave spherical surface which is guided upon an alignment control device separately supported on the inner joint member. The cage is also provided with a spherical outer surface which is guided upon the bore surface of the outer joint member. The centers of the cage outer and inner spherical surfaces are positioned equidistantly on opposite sides of the ball plane.

In conventional and known forms of constant velocity torque transmitting joints of the general category as defined above the alignment control device may comprise an annular member or a plurality of individual members for guiding the cage so that during bending of the joint with respect to its straight line position the axis of the cage will assume an angle which is a predetermined subdivision of the bending angle of the joint. In the joint as described above, the cage axis generally bisects the bending angle of the joint.

Generally, the alignment control device is manufactured as a separate component having a particular shape or structure. The manufacturing process and the cost of manufacturing of such a joint is therefore increased by the necessity of providing a special alignment component.

It is therefore the principal object of the present invention to provide for such a constant velocity torque transmitting joint as described above which eliminates the necessity of a special alignment component and which thus achieves maximum economy in fabrication.

It is another object of the present invention to provide a novel and improved alignment control device for such a constant velocity torque transmitting joint.

According to one aspect of the present invention a constant velocity torque transmitting joint has outer and inner joint members drivingly connected by torque transmitting elements retained in a cage between the joint members. The cage has an outer spherical surface which is guided in the bore of the outer joint member and has an inner spherical surface which is guided upon a separate alignment control device supported on the inner joint member. The centers of the convex outer and concave inner cage spherical surfaces are positioned equidistantly on opposite sides of a plane passing through the centers of the torque transmitting elements. The inner joint member is provided with a plurality of circumferentially spaced recesses between the grooves therein. The alignment control device comprises a plurality of control elements within the spaced recesses and the centers of the control elements and the center of the cage concave spherical surfaces are located in a common plane.

The present invention has the advantage that standard components may be employed as the control elements in the alignment control device and that the recesses within which the control elements are accommodated may be manufactured in the same operation which forms the ball track grooves. A further advantage is that the outer spherical surface of the inner joint member does not require polishing or fine finishing operations because the cage is supported upon the alignment control elements.

Further according to the present invention when the joint is a sliding joint the recesses may be in the form of grooves extending parallel with the ball track grooves. In a non-sliding joint the recesses will enclose the control elements or may have a configuration substantially conforming to the shape of the control elements.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
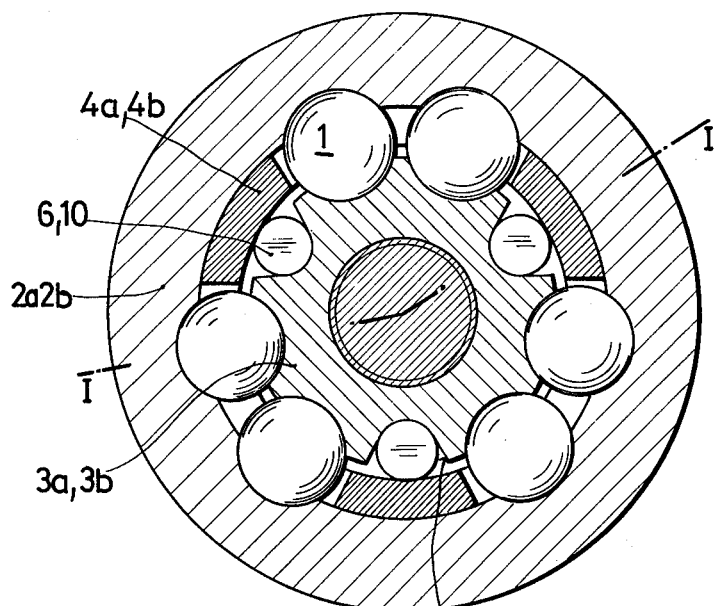
FIG. 1 is a sectional view taken along the line II—II in each of FIGS. 2–6.
Figure 2:
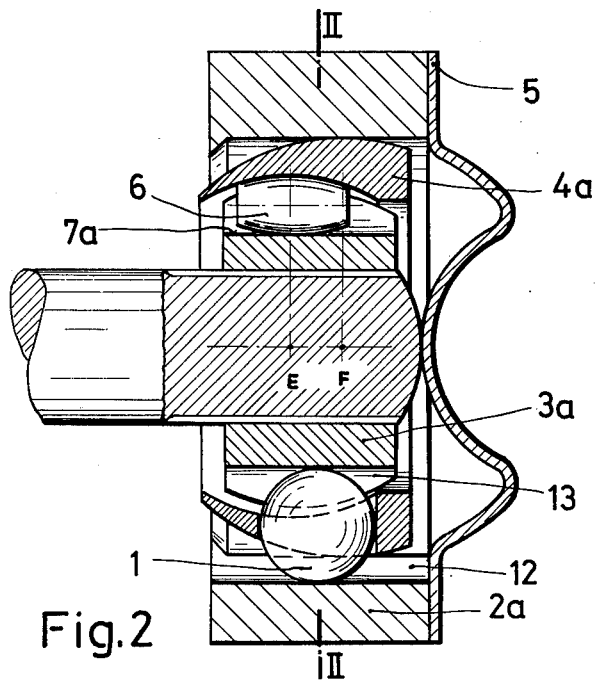
FIG. 2 is a longitudinal sectional view of a constant velocity joint having barrel-shaped alignment control elements according to the present invention.

In FIGS. 1 and 2 there is illustrated a constant velocity torque transmitting universal joint comprising an outer joint member 2a having an axial cylindrical bore therethrough and a plurality of circumferentially spaced axially extending grooves 12 formed in the surface of the axial bore. Since the components for the several modifications are substantially the same as viewed in FIG. 1 this figure also has the reference numerals for the corresponding components in the modifications of this invention.

An inner-joint member 3a is positioned within the axial bore of the outer joint member and has an outer convex spherical surface in which are formed a plurality of longitudinally extending grooves 7a. Positioned radially between the inner and outer joint members is a retainer cage 4a which has an inner concave spherical surface and an outer convex spherical surface guided in the axial bore of the outer joint member 2a. The outer spherical surface of the inner joint member 3a is provided with a plurality of axially extending circumferentially spaced ball track grooves 13 which are corresponding in number and opposed from the grooves 12 in the outer joint member so as to define pairs of opposed grooves.

The cage 4a has a plurality of circumferentially spaced radial openings in which are retained torque transmitting balls 1 which are jointly received in pairs of opposed grooves 12 and 13 of the outer and inner joint members 2a and 3a, respectively.

The groove 7a is formed between two relatively adjacent grooves 13 in the inner joint member 3a and accommodates the alignment control elements 6. The control elements 6 have the shape of barrel-shaped rollers and the radius of curvature in the axial direction of the barrel-shaped roller corresponds to that of the inner concave spherical surface of the cage. As a result of this relationship the control elements 6 have linear contact with the inner surface of the cage 4A. The control elements 6 are slidable within the guide grooves 7a. As can be seen in FIG. 2, the center of curvature of the concave inner surface of the cage and of the control elements 6 is located at point E which is on one side of a plane passing through the centers of the torque transmitting balls 1. The center of the radius of curvature of the outer spherical surface of the cage 4a is located at point F which is on the other side of the ball plane at a distance which is equidistant to the distance of point E from the ball plane.

A flexible cover or boot 5 may enclose one end of the joint as shown in FIG. 2.

It is pointed out that the joint shown in FIG. 2 is a slidable joint in that the control elements 6 are received in grooves 7a so as to be capable of axial displacement during bending of the joint.

Figure 3:
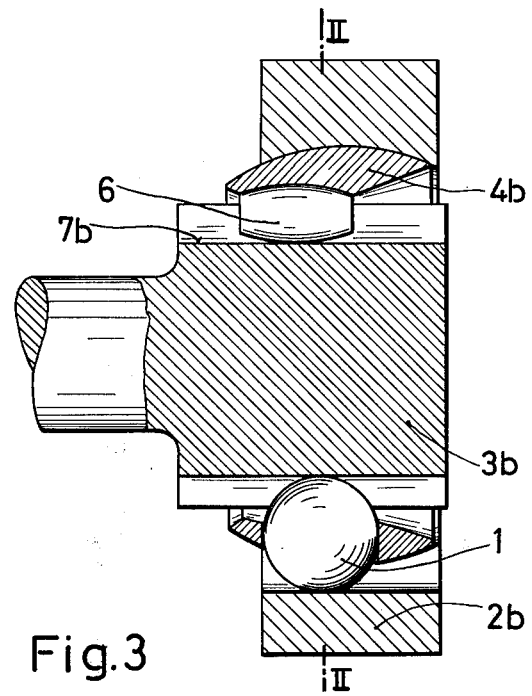
FIG. 3 is a view similar to that of FIG. 2 but wherein the inner joint member has a cylindrical outer face.
Figure 4:
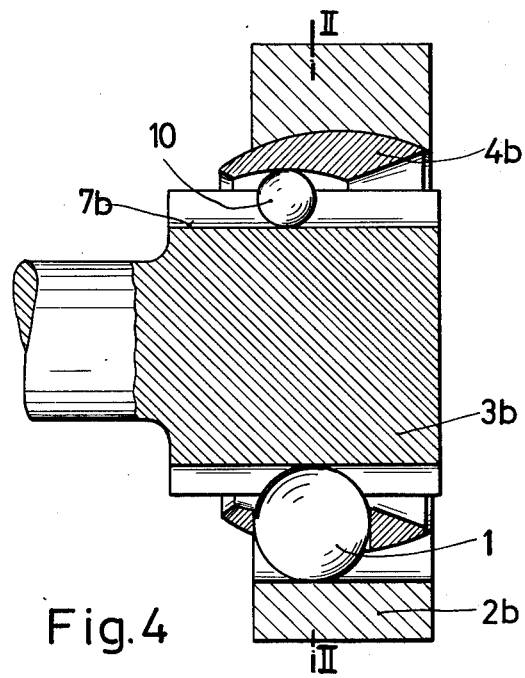
FIG. 4 is a view similar to that of FIG. 3 but using balls as control elements.

In FIGS. 3 and 4, there are illustrated constant velocity torque transmitting joints which are similar to the joint of FIG. 2 but the inner joint member 3b is provided with an outer cylindrical face in which are formed the ball track grooves 13 as well as the control element guide grooves 7b. Accordingly, the outer joint member 2b and inner joint member 3b are capable of relative axial displacement. The spherical outer surface of the cage is guided in an inner concave spherical surface of the outer joint member 2b.

In the joint of FIG. 3, the control elements are in the form of barrel-shaped rollers 6 whereas in FIG. 4, the control elements are in the form of balls 10.

Figure 5:
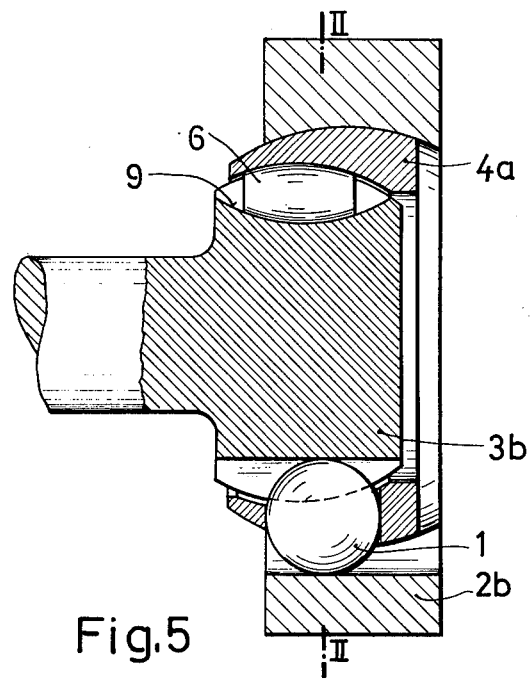
FIG. 5 is a view similar to that of FIG. 3 but wherein the joint is a non-sliding joint.
Figure 6:
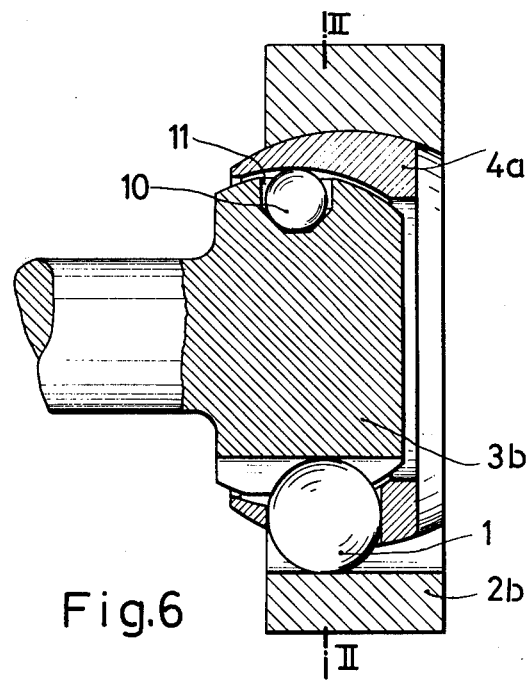
FIG. 6 is a view similar to that of FIG. 4 but showing a non-sliding joint.

In FIGS. 5 and 6 there are illustrated constant velocity torque transmitting joints which are non-slidable and are incapable of relative axial displacement between the inner and outer joint members. In FIG. 5, there is provided a barrel-shaped control element 6 guided in a recess 9. In FIG. 6, the control element is in the form of a ball 10 received within a recess or pocket 11. Since the alignment control elements 6 and 10 of FIGS. 5 and 6 are not slidable within their respective recesses 9 and 11 and the spherical outer face of the cage 4a is guided within a spherical surface of the outer joint member 2b, no relative axial displacement is possible between the inner and outer joint members 3b and 2b respectively.

Figure 7:
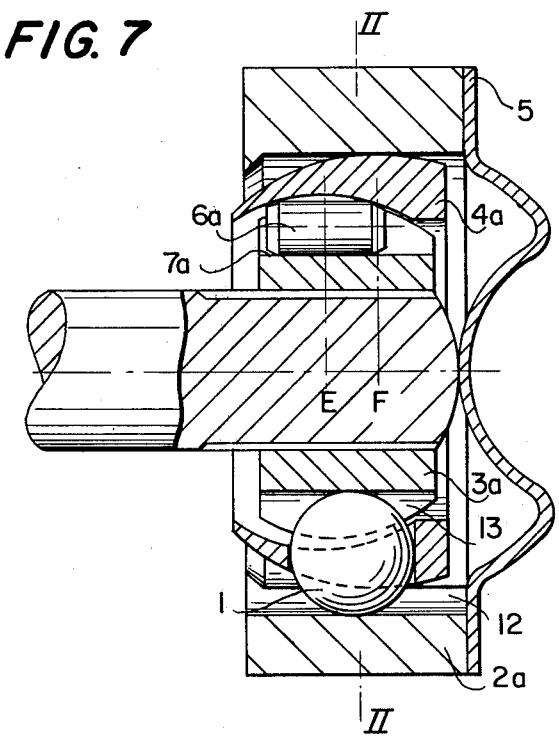
FIG. 7 is a view similar to that of FIG. 2 but showing cylindrical roller control elements.

In FIG. 7 there is illustrated a constant velocity sliding joint similar to the joint of FIG. 2 but employing cylindrical rollers 6a as the alignment control elements. The ends of the rollers are bevelled so as to contact the inner spherical surface of the cage 4a. The cylindrical control elements provide at least one line contact between each control element and the inner joint member, depending on the relative radii of the control elements and the grooves in which they are seated. Point or relative short line contact will occur between each control element and the cage again dependent upon the relative radii of the co-acting surfaces thereof.

Thus it is apparent that the present invention has provided a constant velocity torque transmitting joint utilizing alignment control elements comprising balls, cylindrical rollers or barrel-shaped rollers which elements are commonly manufactured in connection with such joints. As a result, the necessity for special alignment control elements is eliminated and considerable economies are achieved in the production and assembly of such joints.

It will be understood that this invention is susceptible to modification in order to adapt it to different usages and conditions, and accordingly, it is desired to comprehend such modifications within this invention as may fall within the scope of appended claims.

What is claimed is:

1. A constant velocity torque transmitting joint comprising an outer joint element having a bore therethrough and a plurality of grooves in the surface of said bore, an inner joint element within said bore and having a plurality of grooves in its outer surface corresponding in number to said outer joint element grooves to define pairs of opposed grooves, a plurality of balls between said joint elements with each ball being in a pair of opposed grooves, a cage between said joint elements and having a plurality of openings therein to retain said balls in a plane which is perpendicular to the axis of the cage and which bisects the angle between the joint elements, said cage having a first spherical surface on its outer face and a second spherical surface on its inner face, means on the inner face of said outer joint element co-acting with said cage first spherical surface for guiding said cage with respect to said outer joint element, alignment control means on said inner joint element supporting and guiding said cage second spherical surface, the centers of said first and second cage spherical surfaces being equidistant on opposite sides of said ball plane, there being a plurality of circumferentially spaced recesses in said inner joint element between the grooves therein, said alignment control means comprising a plurality of control elements within said plurality of spaced recesses, the centers of said control elements and the center of said cage second spherical surface being located in a common plane.

2. A constant velocity torque transmitting joint as claimed in claim 1 wherein said control elements comprise one of balls, cylindrical rollers and barrel-shaped rollers.

3. A constant velocity torque transmitting joint as claimed in claim 1 wherein the joint is a sliding joint and said recesses comprise axially extending grooves parallel to said ball grooves.

4. A constant velocity torque transmitting joint as claimed in claim 1 wherein the joint is a non-sliding joint and said control elements are seated in the respective recesses.

5. A constant velocity torque transmitting joint as claimed in claim 2 wherein said control elements comprise barrel-shaped rollers having a radius of curvature in the axial direction corresponding to that of said cage second spherical surface.

* * * * *